Figure 1:
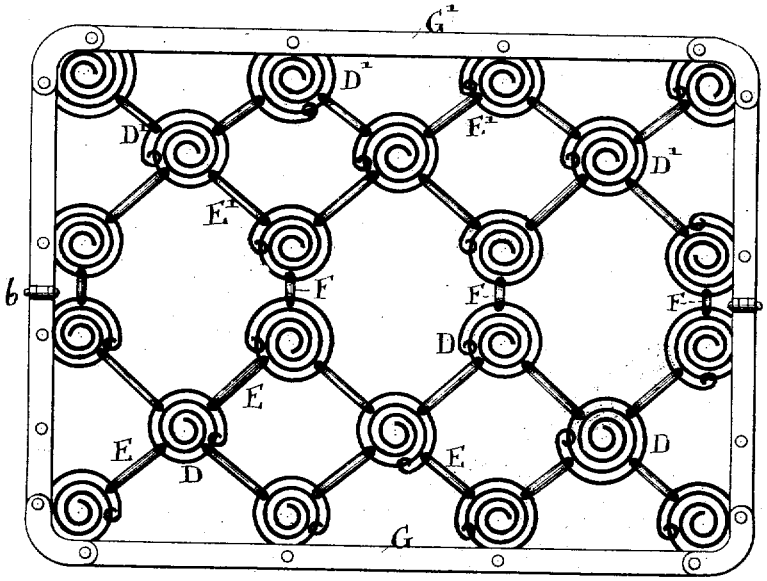

S. H. REEVES.

SPRING BED BOTTOM.

No. 10,179. Reissued Aug. 8, 1882.

Witnesses:-
T. J. Keane
James R. Bowen.

Inventor:-
Sam'l H. Reeves
By his attorney
Edwin H. Brown.

N. PETERS, Photo-Lithographer, Washington, D. C.

UNITED STATES PATENT OFFICE.

SAMUEL H. REEVES, OF SOUTH ORANGE, NEW JERSEY.

SPRING BED-BOTTOM.

SPECIFICATION forming part of Reissued Letters Patent No. 10,179, dated August 8, 1882.

Original No. 178,671, dated June 13, 1876. Application for reissue filed December 6, 1881.

*To all whom it may concern:*

Be it known that I, SAMUEL H. REEVES, formerly of Brooklyn, in the county of Kings and State of New York, but now of South Orange, in the county of Essex and State of New Jersey, have invented a new and Improved Spring Bed-Bottom, of which the following is a specification.

My invention consists in a bed-bottom composed of two longitudinal and severally-complete sections, each consisting of a bottom surface or frame-work comprising longitudinal and cross slats, spiral or helical springs, and connections between the top coils of said springs and an outer rim, forming a top or resting surface, said sections being located side by side and so combined that each is capable of yielding upon the movements of an occupant without materially disturbing the other section or an occupant thereon. These sections may be folded laterally one over the other to facilitate transportation or to afford convenient access to the bedstead on which the bed-bottom is used.

My invention also consists in a spring bed-bottom composed of two longitudinal and severally-complete sections, each consisting of a bottom surface or frame-work comprising longitudinal and cross slats, spiral or helical springs, and connections between the top coils of said springs and an outer rim forming a top or resting surface, said sections being hinged together side by side at the top or resting surface, so that each is capable of yielding upon the movements of an occupant without materially disturbing the other section or an occupant thereon.

My invention also consists, in a spring bed-bottom, of upright springs and obliquely-extending connections between the springs.

My invention also consists, in a spring bed-bottom, in the combination of upright springs arranged in rows so disposed that the springs in one row are opposite the spaces between those of the adjacent row or rows, and obliquely-extending connections between the springs.

My invention also consists in the combination of a bottom surface or frame-work composed of a number of longitudinal slats, cross-slats tying or uniting the same at their ends, spiral or helical springs attached to the said bottom frame-work, and a top or resting surface composed of the top coils of the said springs, a series of single links connecting said coils of the springs in such manner as to preserve their relative arrangement without interfering with their independent action, and an inclosing frame or rim attached to the outer rows of the springs, whereby I produce a remarkably light cheap spring bed-bottom, ill adapted to harbor vermin, and having at all points an independently-yielding surface, resembling that of a feather-bed.

The accompanying drawings represent my improved spring bed-bottom made so that it is capable of being folded laterally at or near the middle of its width.

Figure 2:
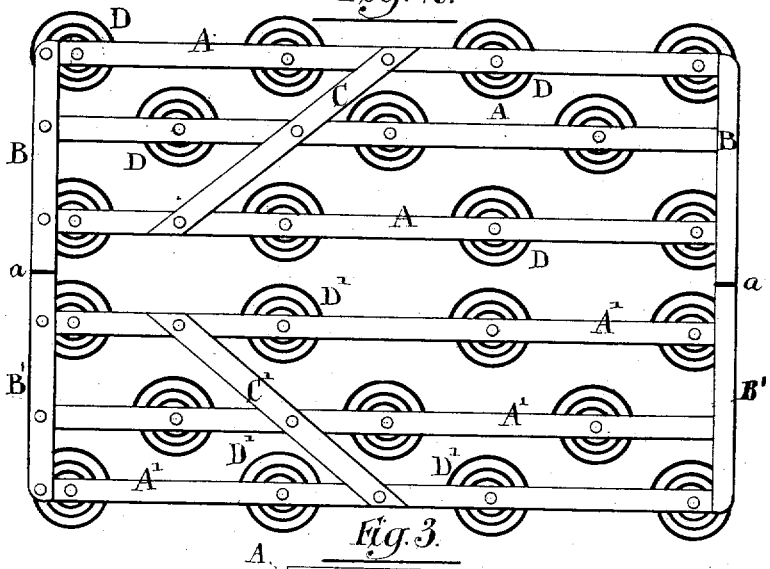

Figure 1 is a plan of the top or resting surface of such a spring bed-bottom. Fig. 2 is an inverted plan of the bottom surface or frame-work of the same, and Fig. 3 is a transverse section of the said spring bed-bottom when folded.

Similar letters of reference designate corresponding parts in all the figures.

A A′ designate two sets of parallel slats, preferably made of hoop-iron, and extending lengthwise of the spring-bottom. The set of slats A are tied or united at their respective ends by cross-slats B, preferably of the same material, and secured in place by rivets or otherwise. The slats A′ are likewise tied or united at their ends by similar cross-slats, B′. In this manner a bottom surface or frame-work composed of two similar but entirely distinct sections or parts is formed.

Figure 3:
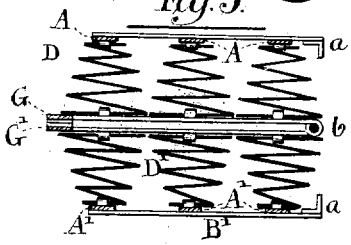

The meeting ends of the cross-slats B and B′ are preferably provided with butts or upturned tips *a*, as represented in Fig. 3, to prevent them from slipping over one another.

Slats C C′, arranged obliquely across the sets of slats A and A′, serve to brace them together, but may be dispensed with when desirable. The slats of the bedstead take the place of the cross-pieces usually employed in conjunction with longitudinal slats to support the springs of the bed-bottom. Hence the bottom frame-work is simplified and rendered lighter and cheaper.

D D′ designate a number of spiral springs arranged in two series or sets, lettered respectively D and D′, and secured at the apex or small end to the sets of slats A and A′ by means of clasps and rivets or other suitable means. The top coils of the springs D, forming one set, are connected in diagonal lines or rows by links E, consisting of short pieces of wire having their ends clasped or bent around the same, and the top coils of the springs D′ are similarly connected by links E′. The office of these links is to preserve the relative arrangement of the springs of the bed-bottom without materially interfering with their independent action under pressure, and they accomplish this far better than chains, twine, or webbing could do, for, by their stiffness, they hold the springs away from one another, besides connecting them together, and withal allow them to yield independently under pressure.

F designates links or loops connecting the adjacent longitudinal rows of springs E E′ loosely together, allowing the springs of each set E or E′ to yield independently of those in the other set.

G G′ designate two sections of a rectangular frame or rim, which preferably have round corners, are connected by hinge-joints *b*, and secured by clips and rivets or in any other suitable manner to the top coils of the outer rows of springs.

It is obvious that the spring bed-bottom thus made consists essentially of two longitudinal sections, A B D E G and A′ B′ D′ E′ G′, and that it may be folded laterally, one section on the other, as illustrated in Fig. 3. It may, however, be made without provision for folding, in which case the bottom surface or frame-work will not be divided into sections, the springs need not be arranged in two series, and the frame or rim of the top or resting surface need not consist of two sections. The rows of springs are so disposed that the springs in one row are opposite the spaces between the springs of adjacent rows.

The advantages possessed by this improved spring bed-bottom are numerous. Each spring being free to yield independently of the others, the whole top or resting surface is capable of adapting itself to the contour of the person lying upon it. Hence it affords the greatest possible comfort, and thereby greatly induces sleep. It weighs but little compared with other spring bed-bottoms, its bottom frame being of very simple construction, the springs few in number, and the top or resting surface also very simple, inasmuch as it consists mainly of the top coils of the springs. Especially when constructed to form two entirely distinct longitudinal sections, each capable of yielding without materially disturbing the other, as illustrated in the drawings, it is well adapted for use by two persons, because the restlessness of one person will affect only the section on which he lies, and hence will not disturb a person lying on the other section. It is very cheap and ill adapted to harbor vermin, and when thus constructed the provision for folding laterally facilitates packing for transportation, and also the cleaning of a bedstead on which it may be used, because instead of having to be lifted bodily it may be folded one section on the other, as before explained, and when thus folded it will remain in this condition, and will not fall back again, like a spring bed-bottom composed of a number of sections and adapted to be rolled up, and therefore does not need to be held while the bedstead is being cleaned.

A bed composed of two longitudinal sections is vastly superior to one composed of two transverse sections. There is less leverage in turning one section on the other. It can be reached conveniently in two places. Hence it may be the more easily turned. The line of junction between the sections is so located as to be of advantage, rather than an objection, to the occupants of the bed. In short, this spring bed-bottom having a resting-surface which will perfectly adapt itself to the contour of the person resting upon it, and having a simple bottom frame-work and few springs, it combines the advantages of lightness and cheapness with the greatest possible comfort, and hence meets a want experienced by a large portion of the public.

What I claim as my invention, and desire to secure by Letters Patent, is—

1. A spring bed-bottom composed of two longitudinal and severally-complete sections, each consisting of a bottom surface or frame-work comprising longitudinal and cross slats, spiral or helical springs, and connections between the top coils of said springs and an outer rim, forming a top or resting surface, said sections being located side by side and so combined that each is capable of yielding upon the movements of an occupant without materially disturbing the other section or an occupant thereon, substantially as specified.

2. A spring bed-bottom composed of two longitudinal and severally-complete sections, each consisting of a bottom surface or frame-work comprising longitudinal and cross slats, spiral or helical springs, and connections between the top coils of said springs and an outer rim, forming a top or resting surface, said sections being hinged together side by side at the top or resting surface, so that each is capable of yielding upon the movements of an occupant without materially disturbing the other section or an occupant thereon, substantially as specified.

3. In a spring bed-bottom, the combination of upright springs and obliquely-extending connections between the springs, substantially as herein set forth.

4. In a spring bed-bottom, the combination of upright springs arranged in rows so disposed that the springs in one row are opposite the spaces between those of the adjacent row or rows, and obliquely-extending connections between the springs, substantially as herein set forth.

5. The spring bed-bottom composed of a bottom surface or frame-work consisting of longitudinal slats tied or united by cross-slats, a number of spiral or helical springs secured to said bottom frame-work, links connecting the top coils of the said springs, and a frame or rim attached to the top coils of the outer rows of said springs, the whole combined and organized substantially as and for the purposes herein set forth.

SAML. H. REEVES.

Witnesses:
JAMES R. BOWEN,
T. J. KEANE.